April 19, 1938.  V. W. GIDEON  2,114,343
GRINDING MACHINE
Filed May 28, 1937   4 Sheets-Sheet 1

Inventor
Victor W. Gideon.
By Charles W. Hills
Attys.

April 19, 1938.  V. W. GIDEON  2,114,343
GRINDING MACHINE
Filed May 28, 1937  4 Sheets-Sheet 2

Inventor
Victor W. Gideon.
By Charles W. Hills
Attys

April 19, 1938. V. W. GIDEON 2,114,343
GRINDING MACHINE
Filed May 28, 1937 4 Sheets-Sheet 4

Inventor
Victor W. Gideon.
by Charles W. Hills
Attys.

Patented Apr. 19, 1938

2,114,343

UNITED STATES PATENT OFFICE 2,114,343

GRINDING MACHINE

Victor W. Gideon, Chicago, Ill., assignor to Boyer-Schultz Corporation, Chicago, Ill., a corporation of Illinois Application May 28, 1937, Serial No. 145,229

16 Claims. (Cl. 51—34)

My invention relates to a grinding machine, particularly of the vertical type in which a spindle for supporting the grinding element such as a grinding disc or cylinder is rotatable at comparatively high velocity on its longitudinal axis and is longitudinally reciprocated at a comparatively low speed.

An important object of the invention is to provide an arrangement in which the longitudinal axis of the grinder spindle is coincident with the axis of rotation of the rotor element of a high speed electrical driving motor.

A further object of the invention is to provide an arrangement in which the grinder spindle extends through a sleeve, concentric therewith and secured to the rotor element of an electric motor, and with an improved friction driving train between the sleeve and the spindle for high speed rotation of the spindle.

Another object is to provide an arrangement in which a driving train between the electric motor and the spindle includes a driving ring connected with the motor and concentric with the spindle, and a cluster of rotary transmission elements around the spindle having friction connection with the driving ring and the spindle for high speed rotation of the spindle.

Another object is to make the rotary transmission elements more or less resilient, and to provide adjustment means for radial contraction of the driving ring for sufficient resilient pressure engagement of the transmission elements with the spindle to assure efficient and noiseless operation of the driving train and of the spindle.

A further object is to provide an improved cam structure for effecting a longitudinal reciprocation of the grinder spindle, and to provide reduction gearing, preferably of the differential gear type, for operation of the cam mechanism at comparatively low speed by a comparatively high speed electric motor the axis of rotation of which is coincident with the longitudinal axis of the spindle.

Still another important object is to interpose a hydraulic transmission link between the cam mechanism and the spindle whereby axial reciprocation of the spindle may be effected with minimum strain on the spindle and its supporting structure and whereby the spindle will be substantially hydraulically floated during axial reciprocation thereof.

In addition to the above enumerated features, the invention embodies other features of construction, arrangement and operation, all of the features being incorporated in the structure shown on the drawings, in which drawings:

Figure 6 shows a grinder wheel spindle applied in the supporting collet.

Figure 1:
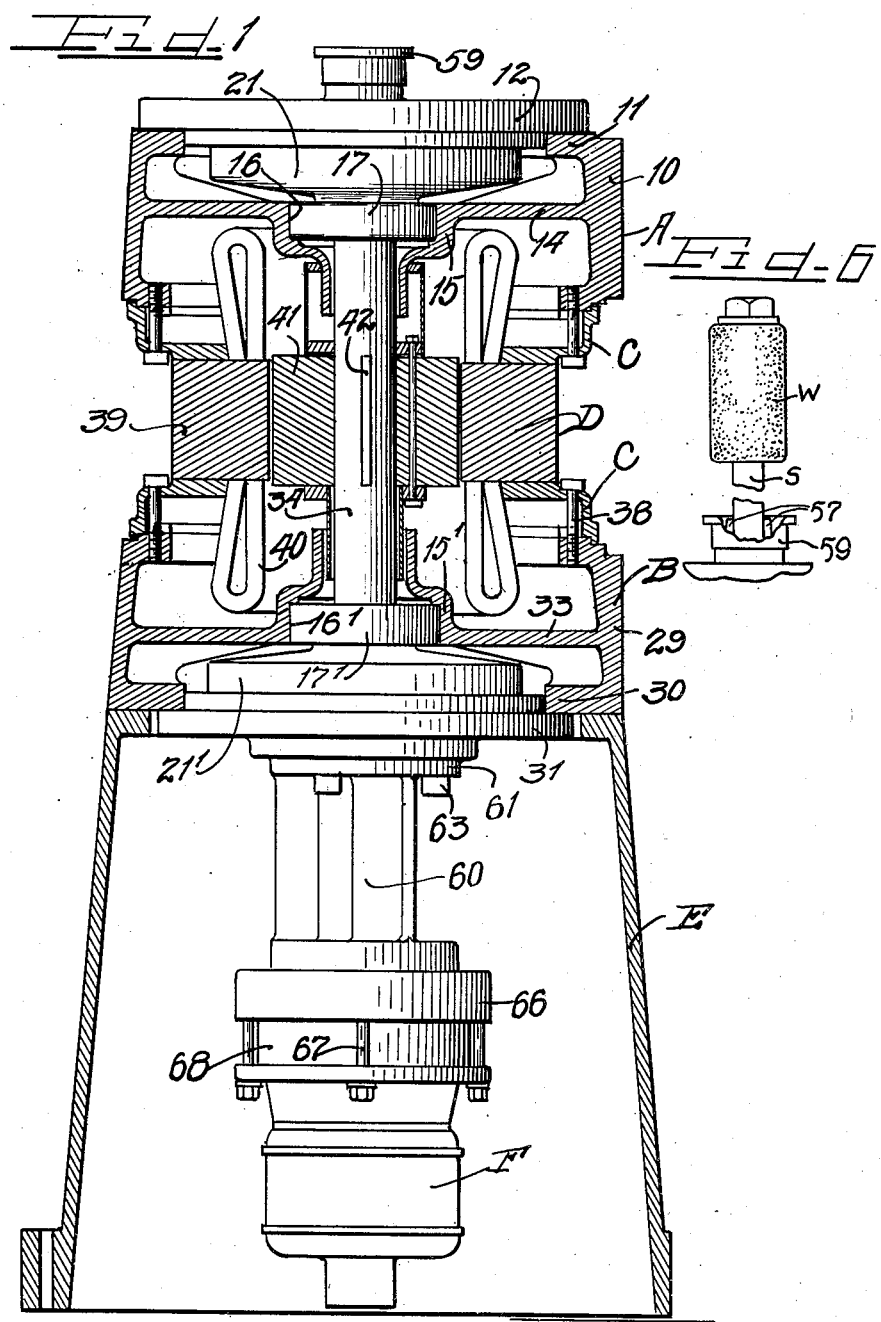
Figure 1 is a side elevation of the machine with the spindle rotating motor and the machine supporting frame work in vertical longitudinal section.

Referring to Figure 1, the machine frame work comprises upper and lower housing frames A and B for the spindle bearing and driving structure, the intermediate frame C for supporting the motor element D, and a supporting base E within which is the motor F and the mechanism driven thereby for effecting the axial oscillation of the grinder spindle.

The upper frame A comprises the outer wall or rim 10 of generally cylindrical shape having at its upper end the horizontally inwardly extending annular flange 11 for supporting a plate or cover 12 which is secured as by means of screws 13. Intermediate its ends, the wall 10 has the diametral extending web wall 14 having the hub 15 providing a cylindrical recess 16 for the outer ring 17 of a ball bearing, the ring seating on the annular shoulder 18 at the bottom of the recess. The inner ring 19 of the ball bearing is secured to the hub 20 of the dished or bell frame 21 providing at its peripheral portion the horizontal annular seat 22 and the retaining flange 23 extending vertically upwardly. Bearing balls 24 interpose between the inner and outer bearing rings 17 and 19.

Figure 4:
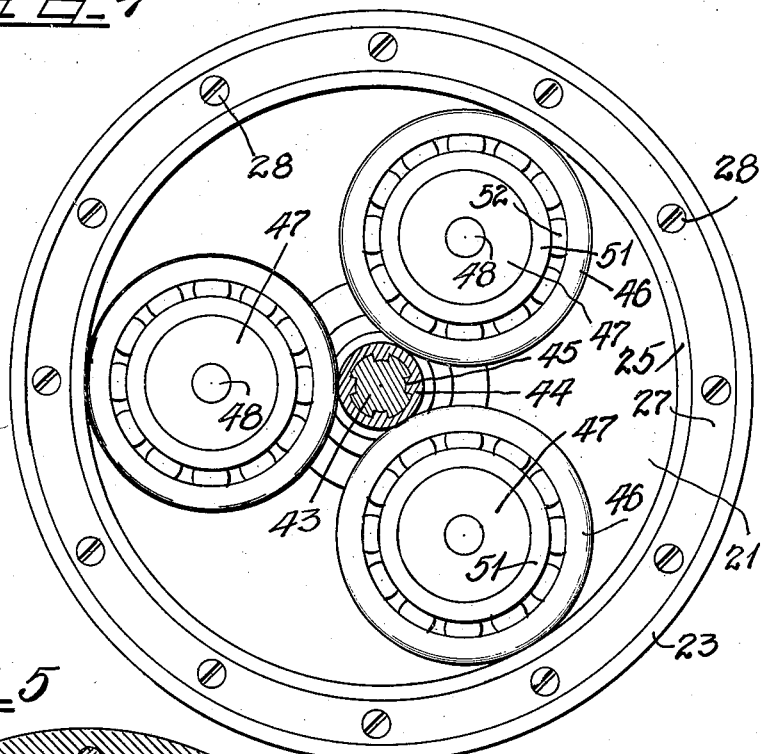
Figure 4 is a section on plane IV—IV Figure 2.
Figure 5:
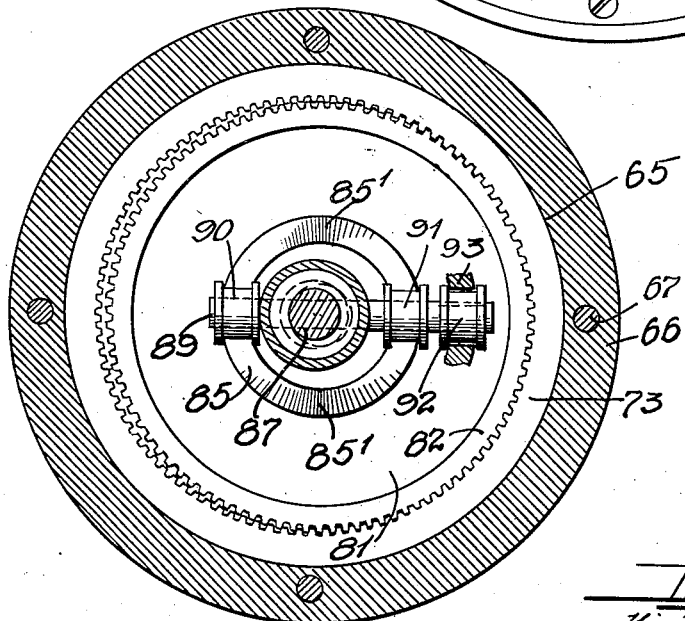
Figure 5 is a section on plane V—V Figure 3.

Seated on the shoulder 22 of the driving frame 21 is the driving ring 25 whose outer face is beveled, as indicated at 26, a wedge ring 27 being inserted between the driving ring and the flange 23, the inner face of the wedge ring being beveled to correspond to the bevel 26 of the driving ring, screws 28 extending through the wedge ring and threading into the frame 21. As best shown by Figure 4, there is a sufficient number of screws 28 so that when the screws are tightened and the wedge ring is drawn inwardly, the wedge engagement of the wedge ring with the driving ring may effect radial contraction of the driving ring for the purpose presently to be described.

The lower frame B has the outer annular wall 29 from whose lower end the annular flange 30 extends horizontally inwardly, the flange having the supporting wall or cover 31 secured thereto as by screws 32. The web 33 intermediate the ends of the wall 29 has the hub 15' providing the recess 16' for the ball bearing structure comprising the outer rings 17' and 19' and the ball 24', the inner ring 19' being secured to the hub 20' of the driving frame 21' whose construction is the same as the upper frame 21, the seat 22' of the frame 21' receiving the beveled driving ring 25', and the wedge ring 27' engaging between the driving ring and the flange 23' and being adjustable by screws 28'.

The hubs 20 and 20' of the upper and lower driving frames 21 and 21' are secured to the upper and lower ends respectively of a sleeve 34 as by means of keys 35 and 35'. Nuts 36 and 36' thread on the end of the sleeve 34 and abut the outer ends of the hubs 20 and 20', lock washers 37 and 37' being preferably interposed.

The frame C is interposed between the upper and lower frames A and B and is detachably secured as by screws 38. The frame supports the field frame 39 of the electric motor structure D, the field frame being energized by windings 40. The armature 41 of the motor is secured to the sleeve 34 as by keys 42. The motor thus rotates the sleeve 34 and the driving frames 21 and 21' secured to the upper and lower ends of the sleeve.

The grinder spindle 43 extends through the sleeve 34 and through upper and lower bushings 44 and 44', the spindle having spline connections 45 and 45' with the bushings so as to be movable axially in the bushings but restrained to rotate with the bushings.

In each of the driving frames 21 and 21', there is a cluster of transmission elements for translating the rotation of the driving rings in the frames into rotational movement of the bushings 44 and 44' and of the spindle. The transmission train for the upper driving frame 21 is shown on Figure 4. The transmission train shown comprises three transmission rings 46 spaced 120° apart around the bushing 44 and having frictional engagement with the bushing and with the driving ring 25. The transmission rings are held in spaced position by bearing studs 47 secured as by screws 48 to the top wall or cover 12, Figure 2, the studs having tongues 49 at their base ends for engaging in radial slots 50 in the cover 12 so that the studs will be held against rotation. Mounted on each stud is a bearing ring 51 between which and the corresponding transmission ring 46 bearing balls 52 are interposed so that the transmission rings may freely rotate with minimum friction. The bearing rings 51 rest on flanges 53 on the inner ends of the respective bearing studs and the transmission rings 46 are received between the outer and inner flanges 54 and 55 on the drive bushing 44 which receives the grinder spindle.

The transmission assembly within the lower driving frame 21' is the same as that in the driving frame 21 and the same reference numerals are therefore applied, the transmission rings 46 engaging between the driving ring 25' and the bushing 44', the screws 48 for holding the studs 49 extending through the lower wall or cover 31. Upon rotation of the sleeve 34 and the driving frames 21 and 21', the driving rings 25 and 25', by their frictional engagement with the transmission rings 46, will rotate these rings, and these rings by their frictional engagement with the bushings 44 and 44', will rotate these bushings and the grinder spindle 43 splined thereto. Efficient frictional engagement will be maintained by means of the wedge rings 27 and 27' which rings, when adjusted inwardly by the screws 28 and 28' cause radial contraction of the driving rings for holding the transmission rings against the spindle bushing, and the transmission rings may be sufficiently yieldable or resilient to resiliently frictionally engage the drive bushings to maintain firm frictional contact therewith and to prevent noisy operation.

At its upper end the grinder spindle extends through the passage 56 in the cover 12 and has a collet 57 secured thereto as by a pin 58, this collet serving to receive the supporting spindle S of a grinder wheel or disc W as shown by Figure 6, the collet end being split so as to be contractible by a sleeve 59 to secure the grinder wheel spindle, the sleeve having threaded engagement with the base of the collet and beveled engagement with the end thereof.

Describing now the spindle oscillation controlling mechanism, a supporting frame 60 has the upper flange 61 and fits into the recess 62 in the lower side of the lower wall 31 of the spindle rotating structure, and is detachably secured as by means of screws 63. At its lower end the frame 60 is shaped and flanged to provide the inner chamber 64 and the outer cylindrical chamber or recess 65 surrounded by the flange 66.

By means of bolts 67 extending through the flange 66, the frame of the motor F is suspended from the frame 60, the spacer ring 68 being interposed, the ring extending a distance into the recess 65. The ring 68 has the web 69 supporting the hub 70 in which a ball bearing structure 71 is seated for the end of the shaft 72 of the armature of the motor F, the shaft and the grinder spindle 43 being in axial alignment.

Within the recess 65 is seated the internal gear 73 of the reduction gearing assembly, the gear being clamped between the spacer ring 68 and a retainer ring 74 seated at the bottom of the recess 65.

The armature shaft 72 has the cylindrical radial offset eccentric end 75, and a seating washer 76 rests on the shoulder between the shaft and eccentric end 75 and this washer supports a ring 77 journalled on the eccentric end 75 and forming the inner member of a ball bearing structure whose outer ring 78 is secured in the recess 79 in the lower end of the annular hub 80 supported by the web 81 of the gear ring 82. Bearing balls 83 engage between the inner and outer rings 77 and 78.

The gear 82 forms the inner member of the differential gearing assembly and is of smaller external diameter than the internal diameter of the outer member or gear ring 73. The number of teeth on the inner gear ring 82 is less than the number on the outer ring 73 and as the inner gear progressively meshes with the outer gear during rotation of the inner gear on the eccentric end 75 of the motor shaft, the revolutions per minute of the inner gear will be materially less than the revolutions per minute of the motor shaft. For example, the dimensioning of the gears may be such that with a motor velocity of 1200 revolutions per minute the revolutions per minute of the gear 82 will be only one hundred. To balance the eccentrically mounted inner gear, a weight arm 84 may be secured to the end of the motor shaft 72.

The upper end of the annular hub 80 of the inner gear 82 forms a cam rail 85 and has the cam depressions 85' along its diametrically opposite sides. Extending through the bore 86 of the frame 60 in axial alignment with the grinder spindle 43 is a plunger rod 87 terminating at its lower end in a head 88 through which extends a shaft or pin 89 diametrally thereof. Journalled on the pin at opposite sides of the head are cam rollers 90 and 91 for engaging the cam rail 85, the rollers being flanged so as to retain them on the cam rail. At one end the pin has the flanged head 92 for engaging the retainer lug 93 of the frame 60 so that the pin may be held against axial displacement.

As the eccentrically mounted inner gear 82 is rotated, the cam rail in cooperation with the cam rollers will cause vertical reciprocation of the plunger rod 87, the cam rollers being slidable on the pin 89 following the orbit of the cam hub 80. The plunger 87 might be directly mechanically connected with the grinder spindle 43 for reciprocation thereof, but preferably a hydraulic transmission link is interposed. The upper end of the bore 86 of the frame 60 is of increased diameter to leave a shoulder 94 for seating a packing assembly 95 around the plunger rod 87. A guide sleeve 96 fits in the bore 86 below the shoulder 94 and at its lower end receives the plunger head 88 and the pin 89, a spring 97 between the sleeve and the plunger abutting the plunger and the packing assembly 95, the spring holding the cam rollers to the cam rail and shifting the plunger 87 downwardly after upward movement thereof by the cam means.

The bore of the frame 60 between the packing assembly 95 and the wall 31 is lined by a sleeve or bushing 98 having sets of upper and lower port holes 99 and 100 connected by passages 101 in the surrounding wall of the frame 60. At its upper end, the plunger rod 87 has secured thereto a piston 102 engaging in the bushing 98 between the ports 99 and 100.

Figure 2:
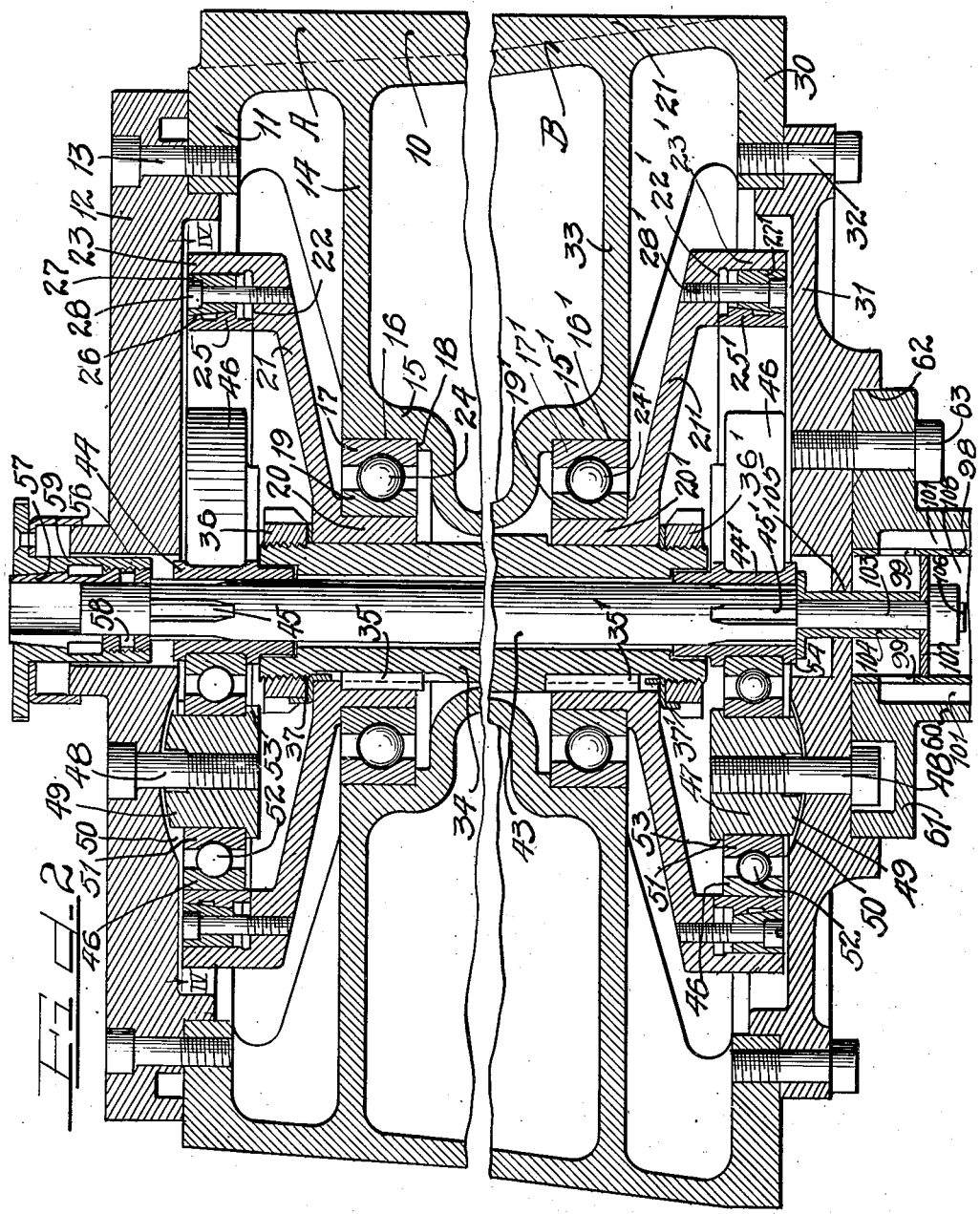
Figure 2 is an enlarged vertical diametral section of the upper and lower portions of the spindle supporting and rotating mechanism therein.
Figure 3:
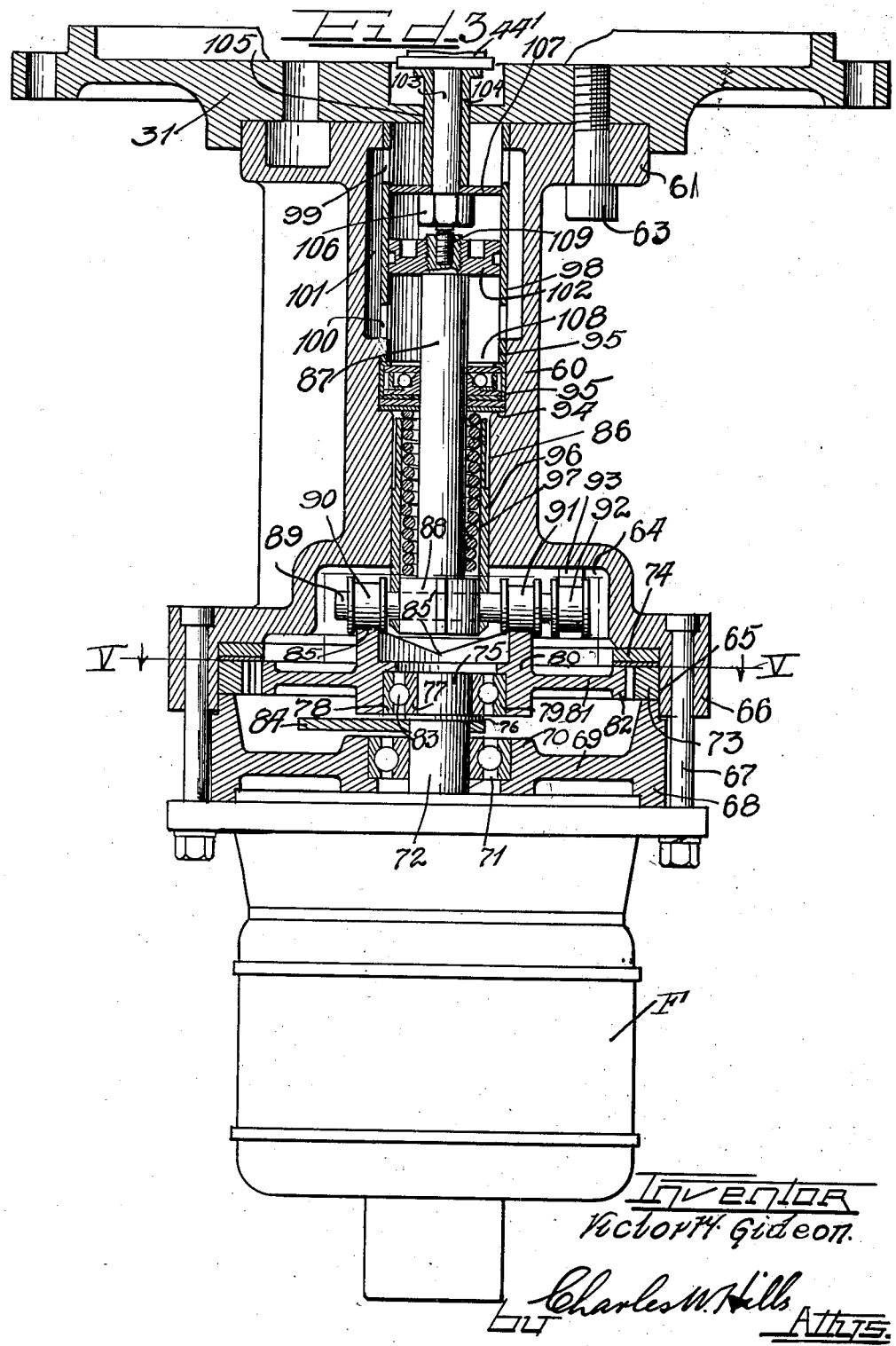
Figure 3 is an enlarged vertical diametral section of the lower portion of the machine to show the mechanism for effecting axial reciprocation of the grinder spindle.

Referring to Figures 2 and 3, the grinder spindle 43 has the reduced extension 103 at its lower end surrounded by a sleeve 104, the end of the sleeve extending through the passage 105 in the wall or cover for projection into the bushing 98. The end of the extension 103 is threaded to receive a nut 106, a piston disc 107 being interposed between the nut and the sleeve 104, and when the nut is tightened the piston disc and the sleeve will be securely clamped to the end 103 between the nut and the body of the grinder spindle. The piston disc 107 engages in the bushing 98 between the upper and lower ports 99 and 100.

The cylinder space 108 formed by the bushing 98, and the passages 101, are kept filled with hydraulic fluid such as oil, and during reciprocation of the plunger rod 87 and its head 102, the fluid is circulated back and forth through the cylinder and the passages 101. In the relative positions of the parts shown on Figures 2 and 3, the grinder spindle 43 is in its uppermost position and the piston disc 107 at the lower end of the spindle assembly is below the upper ports 99. The plunger head 102 is in its high position as the cam rollers are on the highest point of the cam rail. As the cam is turned by the motor F, the cam rollers will move to the bottoms of the cam depression 85' and the spring 97 will shift the plunger rod and head 102 downwardly so that the hydraulic fluid in the lower part of the cylinder space will be forced outwardly through the ports 100 and back to the upper part of the cylinder through the upper port 99, the fluid acting downwardly against the piston disc 107 to shift the grinder spindle assembly downwardly. As the cam rollers travel toward the high points of the cam rail, the plunger head 102 will be shifted upwardly and the hydraulic fluid will be sucked back through the passages 101 from the upper end of the cylinder to the lower end of the cylinder and this suction acting on the disc 107 will raise the grinder spindle assembly, the cam control movement of the plunger structure being thus transmitted hydraulically to the grinder spindle assembly for axial reciprocation thereof at a comparatively low rate of speed while the spindle assembly is being rotated at a comparatively high rate of speed. The amplitude of axial reciprocation is comparatively short.

The piston disc 107 is diametered to reciprocate freely in the cylinder bushing 98 so as not to interfere with the free rotational movement of the grinder spindle assembly. When the machine is idle, the spindle assembly may shift down by gravity to rest against a stop screw 109 in the upper end of the plunger structure 87. However, as soon as the machine is in operation, the spindle assembly is substantially hydraulically floated and is reciprocated without physical contact thereof with the plunger structure and reciprocation is effected without interfering with the free high speed rotation of the spindle assembly.

I thus produce a compact, balanced, and efficient high speed grinding structure which may be economically manufactured. I do not however, desire to be limited to the exact construction, arrangement and operation shown and described as changes and modifications may be made without departing from the scope of the invention.

I claim as follows:

1. A grinder structure of the class described comprising a supporting frame, a driving frame journalled on said supporting frame, a power unit having a rotor element connected with said driving frame for rotating said frame, a spindle coaxial with said driving frame, a driving bushing on said spindle, a driving ring on said driving frame concentric with said bushing, a plurality of flexible rotary transmission elements journalled on said driving frame and engaging said driving ring and said bushing for transmitting the rotary movement of said ring to said bushing and spindle, and means for effecting radial contraction of said driving ring and flexure of said transmission elements whereby said transmission elements are maintained in close frictional contact with said driving ring and bushing.

2. A grinder structure of the class described comprising a supporting frame, a driving frame journalled on said supporting frame, a power unit having a rotor element connected with said driving frame for rotation of said frame, a grinding element supporting spindle coaxial with said driving frame, a driving bushing on said spindle, a driving ring on said driving frame concentric with said bushing, a plurality of flexible transmission rings journalled on said driving frame to be in frictional contact with said driving ring and said bushing for transmitting the rotation of said driving ring to said bushing and spindle, and wedging means interposed between said driving ring and said driving frame and adjustable for radially contracting said driving ring for sufficient flexure of said transmission rings to maintain said transmission rings in intimate contact with said driving ring and bushing.

3. A grinder structure of the class described comprising a supporting frame, a driving frame journalled on said supporting frame, a power unit having a rotor element connected with said driving frame for rotation thereof, a grinding element supporting spindle coaxial with said driving frame, a driving bushing on said spindle, a driving ring on said driving frame concentric with said bushing, a plurality of flexible transmission rings journalled on said driving frame and spaced around said bushing and having frictional contact with said driving ring and bushing, and a wedge ring between said driving ring and said driving frame adjustable for effecting radial contraction of said driving ring and flexure of said transmission rings for maintaining intimate contact of said transmission rings with said driving ring and bushing.

4. In a grinder structure of the class described, a supporting frame, a driving frame journalled on said supporting frame, a power unit having a rotor element connected with said driving frame for rotation thereof, a grinding element supporting spindle coaxial with said driving frame, a bushing on said spindle, a driving ring on said driving frame concentric with said bushing, a plurality of transmission rings between said driving ring and bushing and contacting said driving ring and bushing, an inner ring for each transmission ring mounted on said driving frame, and bearing balls between each transmission ring and its inner ring, said transmission rings being resilient and normally flexed for transmitting the rotary movement of said driving ring to said bushing and spindle.

5. In a grinder structure of the class described, a supporting frame, a driving frame journalled on said supporting frame, a power unit having a rotor element connected with said driving frame for rotation thereof, a grinding element supporting spindle coaxial with said driving frame, a bushing on said spindle, a driving ring on said driving frame concentric with said bushing, a plurality of transmission rings between said driving ring and bushing and contacting said driving ring and bushing, an inner ring for each transmission ring mounted on said driving frame, and bearing balls between each transmission ring and its inner ring, said transmission ring transmitting the rotary movement of said driving ring to said bushing and spindle, said transmission rings being flexible, and wedging means between said driving ring and said driving frame adjustable to effect radial contraction of said driving ring and flexure of said transmission ring whereby said transmission rings will be maintained in intimater contact with said driving ring and bushing.

6. In a grinder structure of the class described, a supporting framework, upper and lower driving frames journalled on said framework, a power unit within said framework having a rotor element connected with said driving frames for rotation thereof, a grinding element supporting spindle extending through said driving frames coaxial therewith, bushings on said spindle, means providing annular driving surfaces on said driving frames concentric with said bushings, rotary transmission elements in said driving frames for transmitting the rotation of said driving surfaces to said bushings and spindle, said spindle being splined to said bushings for axial reciprocation therein, a power unit below said spindle having a driving shaft coaxial therewith, an outer internal gear ring supported concentric with said shaft, an inner external gear, an eccentric drive connection between said shaft and said inner gear for differential engagement of said inner gear with said outer gear, and an axially reciprocable element between said spindle and inner gear and a cam connection between said reciprocable member and said gear for reciprocating said element, and means for transmitting the reciprocating movement of said reciprocating element to said spindle.

7. In a grinder structure of the class described, a supporting framework, upper and lower driving frames journalled on said framework, a power unit within said framework having a rotor element connected with said driving frames for rotation thereof, a grinding element supporting spindle extending through said driving frames coaxial therewith, bushings on said spindle, means providing annular driving surfaces on said driving frames concentric with said bushings, rotary transmission elements in said driving frames for transmitting the rotation of said driving surfaces to said bushings and spindle, said spindle being splined to said bushings for axial reciprocation therein, a power unit below said spindle having a driving shaft coaxial therewith, an outer internal gear ring supported concentric with said shaft, an inner external gear, an eccentric drive connection between said shaft and said inner gear for differential engagement of said inner gear with said outer gear, and an axially reciprocable element between said spindle and inner gear and a cam connection between said reciprocable member and said gear for reciprocating said element, and hydraulic means for transmitting the reciprocable movement of said element to said spindle.

8. In a grinder structure of the class described, a rotatable axially shiftable grinder element supporting spindle, means for rotating said spindle at high speed, a driving element below said spindle having a driving shaft, an axially reciprocable element between said spindle and driving shaft, cam mechanism for reciprocating said element, a differential gear assembly between said driving shaft and said cam mechanism for reducing the speed of said driving element for comparatively slow reciprocation of said reciprocating element, and means for transmitting the reciprocations of said reciprocating element to said spindle.

9. In a grinder structure of the class described, a rotatable axially shiftable grinder element supporting spindle, means for rotating said spindle at high speed, a driving element below said spindle having a driving shaft, an axially reciprocable element between said spindle and driving shaft, cam mechanism for reciprocating said element, a differential gear assembly between said driving shaft and said cam mechanism for reducing the speed of said driving element for comparatively slow reciprocation of said reciprocating element, and hydraulic means for transmitting the reciprocation of said reciprocating element to said spindle.

10. In a grinder structure of the class described, a rotatable axially reciprocable grinding element supporting spindle, means for rotating said spindle at high speed, a power unit below said spindle having a driving shaft, a cylinder below said spindle and said spindle having a piston at its lower end engaging in said cylinder, a plunger having a plunger head operable in said cylinder, means converting the rotation of said shaft into reciprocation of said plunger and its head for displacement of hydraulic fluid in said cylinder, and fluid flow passageways between the ends of said cylinder for the flow of displaced fluid and cooperation thereof with said piston for reciprocation of said spindle.

11. In a grinder structure of the class described, upper and lower supporting frames, driving frames supported in said supporting frames, an electric motor structure having its field element disposed between said supporting frames, a grinding element supporting spindle extending through said driving frames and the armature element of said motor structure being connected to said frames, and transmission trains in said driving frames connecting said driving frames with said spindle for rotation thereof.

12. A grinder structure of the class described comprising a supporting frame, a driving frame journalled on said supporting frame, a power unit having a rotor element connected with said driving frame for rotation thereof, a spindle structure coaxial with said driving frame, a driving ring on said driving frame concentric with said spindle structure, a plurality of resilient rotary transmission elements journalled on said driving frame and engaging said driving ring and said spindle structure for transmitting the rotary movement of said ring to said spindle structure, said transmission elements being under flexure whereby they will tend to expand to maintain close frictional contact with said driving ring and the spindle structure.

13. A grinder structure of the class described comprising a supporting frame, a driving frame journalled on said supporting frame, a power unit having a rotor element connected with said driving frame for rotation of said frame, a spindle structure coaxial with said driving frame, a driving ring on said driving frame concentric with said spindle structure, a plurality of resilient rotary transmission elements journalled on said driving frame and engaged to said driving ring and spindle structure for transmitting the rotary movement of said ring to said spindle structure, said ring being adapted to exert radial pressure on said transmission elements for flexure thereof whereby the expansion tendency of said transmission elements will hold them in close frictional contact with said ring and said spindle structure.

14. In a grinder structure of the class described, a rotatable axially shiftable grinder element supporting spindle, means for rotating said spindle at high speed, a driving unit below said spindle having a driving shaft, cam mechanism, a differential gear assembly between said driving shaft and said cam mechanism for reducing the speed of said driving unit for comparatively slow operation of said cam mechanism, and means for transmitting the movement of said cam mechanism to said spindle for axial shifting thereof.

15. In a grinder structure of the class described, a rotatable axially shiftable grinder element supporting spindle, means for rotating said spindle at high speed, a driving element below said spindle having a driving shaft, cam mechanism, a differential gear assembly between said driving shaft and said cam mechanism for reducing the speed of said driving element for comparatively slow operation of said cam mechanism, and hydraulically controlled means for transmitting the movement of said cam mechanism to said spindle for axial shifting thereof.

16. In a grinder structure of the class described, a rotatable axially shiftable grinder element supporting spindle, means for rotating said spindle, a driving element below said spindle concentric therewith and having a driving shaft, an axially reciprocable element between said spindle and driving shaft, cam mechanism for reciprocating said element, a reduction gearing assembly between said driving shaft and said cam mechanism for reducing the speed of said driving element for comparatively slow reciprocation of said reciprocating element, and hydraulic means for transmitting the reciprocation of said reciprocating element to said spindle.

VICTOR W. GIDEON.